(12) United States Patent
Bickerstaff et al.

(10) Patent No.: US 7,523,190 B1
(45) Date of Patent: Apr. 21, 2009

(54) REAL-TIME PERFORMANCE ASSESSMENT OF LARGE AREA NETWORK USER EXPERIENCE

(76) Inventors: Cynthia L. Bickerstaff, 811 Forest Ave., Palo Alto, CA (US) 94301; Mark A. Vanantwerp, 742 SW. Vista Ave., #57, Portland, OR (US) 97205; William W. Love, 1492 Eagle Nest La., Gilroy, CA (US) 95020; Stacy P. Purcell, 8878 Nimbus Way, Orangevale, CA (US) 95662; Lawrence J. Widmer, 8828 SW. 171st, Beaverton, OR (US) 97007; Jeffrey C. Sedayao, 1513 Oyoma Dr., San Jose, CA (US) 95131

( * ) Notice: Subject to any disclaimer, the term of this patent is extended or adjusted under 35 U.S.C. 154(b) by 0 days.

(21) Appl. No.: 09/471,964

(22) Filed: Dec. 23, 1999

(51) Int. Cl.
*G06F 15/16* (2006.01)
(52) U.S. Cl. .................. 709/224; 709/203; 709/223; 709/227; 709/233; 707/3; 714/47; 714/26
(58) Field of Classification Search ......... 709/223–224, 709/238, 229, 204, 233, 203, 218, 227; 707/6, 707/102, 1, 3, 4, 7; 714/47, 26
See application file for complete search history.

(56) References Cited

U.S. PATENT DOCUMENTS

| | | | | |
|---|---|---|---|---|
| 4,967,345 A * | 10/1990 | Clarke et al. | ................ | 709/241 |
| 5,715,393 A * | 2/1998 | Naugle | ....................... | 709/224 |
| 5,787,253 A * | 7/1998 | McCreery et al. | ........... | 709/231 |
| 5,793,976 A * | 8/1998 | Chen et al. | .................. | 709/224 |
| 5,812,780 A * | 9/1998 | Chen et al. | .................. | 709/224 |
| 5,867,659 A * | 2/1999 | Otteson | ...................... | 709/224 |
| 5,892,917 A * | 4/1999 | Myerson | ..................... | 709/224 |
| 5,913,041 A * | 6/1999 | Ramanathan et al. | ....... | 709/233 |
| 5,946,679 A * | 8/1999 | Ahuja et al. | ................... | 707/3 |
| 5,968,125 A * | 10/1999 | Garrick et al. | .............. | 709/224 |
| 5,983,270 A * | 11/1999 | Abraham et al. | ............ | 709/224 |
| 6,041,041 A * | 3/2000 | Ramanathan et al. | ....... | 370/241 |
| 6,055,572 A * | 4/2000 | Saksena | ...................... | 709/224 |
| 6,085,226 A * | 7/2000 | Horvitz | ...................... | 709/203 |
| 6,108,800 A * | 8/2000 | Asawa | .......................... | 714/47 |
| 6,112,238 A * | 8/2000 | Boyd et al. | .................. | 709/224 |
| 6,148,335 A * | 11/2000 | Haggard et al. | ............. | 709/224 |
| 6,167,431 A * | 12/2000 | Gillies et al. | ................. | 709/203 |
| 6,173,418 B1* | 1/2001 | Fujino et al. | .................. | 714/20 |
| 6,230,204 B1* | 5/2001 | Fleming, III | ................ | 709/224 |

(Continued)

OTHER PUBLICATIONS

Network Working Group Request for Comments: 1739, "A Primer On Internet and TCP/IP Tools", G. Kessler and S. Shepard, Hill Associates, Inc. Dec. 1994.*

(Continued)

*Primary Examiner*—Alina N. Boutah
(74) *Attorney, Agent, or Firm*—Blakely, Sokoloff, Taylor & Zafman LLP

(57) ABSTRACT

A method, system, and computer program for real-time measurement and modification of the performance of communications on a large area network, such as the Internet, based upon actual user experience. One embodiment performs a statistical analysis of access logs that record actual server usage by users. Based on such analysis, routing of communications over the network can be modified to improve overall communications performance.

52 Claims, 4 Drawing Sheets

U.S. PATENT DOCUMENTS

| | | | |
|---|---|---|---|
| 6,317,786 B1 * | 11/2001 | Yamane et al. | 709/224 |
| 6,317,787 B1 * | 11/2001 | Boyd et al. | 709/224 |
| 6,438,537 B1 * | 8/2002 | Netz et al. | 707/3 |
| 6,470,388 B1 * | 10/2002 | Niemi et al. | 709/224 |
| 6,477,523 B1 * | 11/2002 | Chiang | 707/2 |
| 6,490,617 B1 * | 12/2002 | Hemphill et al. | 709/223 |
| 6,490,620 B1 * | 12/2002 | Ditmer et al. | 709/224 |
| 6,560,648 B1 * | 5/2003 | Dunn et al. | 709/224 |
| 6,570,867 B1 * | 5/2003 | Robinson et al. | 370/351 |
| 6,598,078 B1 * | 7/2003 | Ehrlich et al. | 709/224 |
| 6,621,798 B1 * | 9/2003 | Krishnan et al. | 370/256 |
| 6,662,230 B1 * | 12/2003 | Eichstaedt et al. | 709/229 |
| 6,789,115 B1 * | 9/2004 | Singer et al. | 709/224 |
| 7,140,025 B1 * | 11/2006 | Dillow et al. | 719/313 |

OTHER PUBLICATIONS

Definition of "filter" from netlingo.com p. 1 of 1.*

* cited by examiner

REAL-TIME PERFORMANCE ASSESSMENT OF LARGE AREA NETWORK USER EXPERIENCE

TECHNICAL FIELD

This invention relates to measuring and modifying the performance of a network, and more particularly to a method, system, and computer program for real-time measurement and modification of the performance of communications on a large area network, such as the Internet, based upon actual user experience.

BACKGROUND

FIG. 1 shows a typical configuration of a large area network, such as the Internet. Multiple geographically dispersed user client systems 100 are connected through user Internet Service Providers (ISPs) 102 to the network "cloud" 104 comprising the Internet backbone communication transport systems. Requests for information or services by a client application program executing on a user client system 100 may be routed through multiple server ISPs 106 through a router 108 to a web server 110. The web server 110 retrieves or generates the requested information or provides the requested service, and communicates a response to the requesting client application.

Various attempts have been made to actively assess the performance (e.g., response time, transmission problems, etc.) of Internet connections. Some current methods use active measurement of various network or server components that are dedicated to performance measurement. For example, conventional Internet Control Message Protocol (ICMP) "ping" and "traceroute" commands can be used to measure the performance of the network connections between a client terminal and a server. However, these commands are frequently transmitted with a different (often lower) priority than the protocols used by applications run by users for "web surfing". Accordingly, inaccurate (i.e., false positive) measurements are common.

Attempts have been made to actively measure Internet connections using the same protocols used by end-user applications, such as the HyperText Transfer Protocol (HTTP) "GET" command. These approaches typically use computer programs (sometimes known as "hosts", "agents", or "beacons") residing on measurement instrumentation capable of communicating with Internet protocols. However, such computer programs are limited to assessing network paths only from the specific network nodes on which they are executing. Further these techniques inject traffic into sometimes overburdened Internet, WAN, or LAN infrastructures, causing the measurement process to change the characteristics being measured. Additionally, these techniques are relatively expensive to implement.

A further problem of all of these active or injected measurement approaches is that they generate non-value added communication traffic for both local and large area network infrastructures.

SUMMARY

In one aspect, the invention includes a method, system, and computer program for real-time measurement of the performance of communications on a large area network between a selected server and a plurality of users, based upon actual user experience, including: accessing a server log having records of actual user access to the selected server; aggregating records from the server log into a plurality of aggregate slots, each having at least one time bin, based on an aggregation method; performing at least one statistical analysis of each time bin of each aggregate slot; and outputting the results of such statistical analysis as an indication of actual server usage by users.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
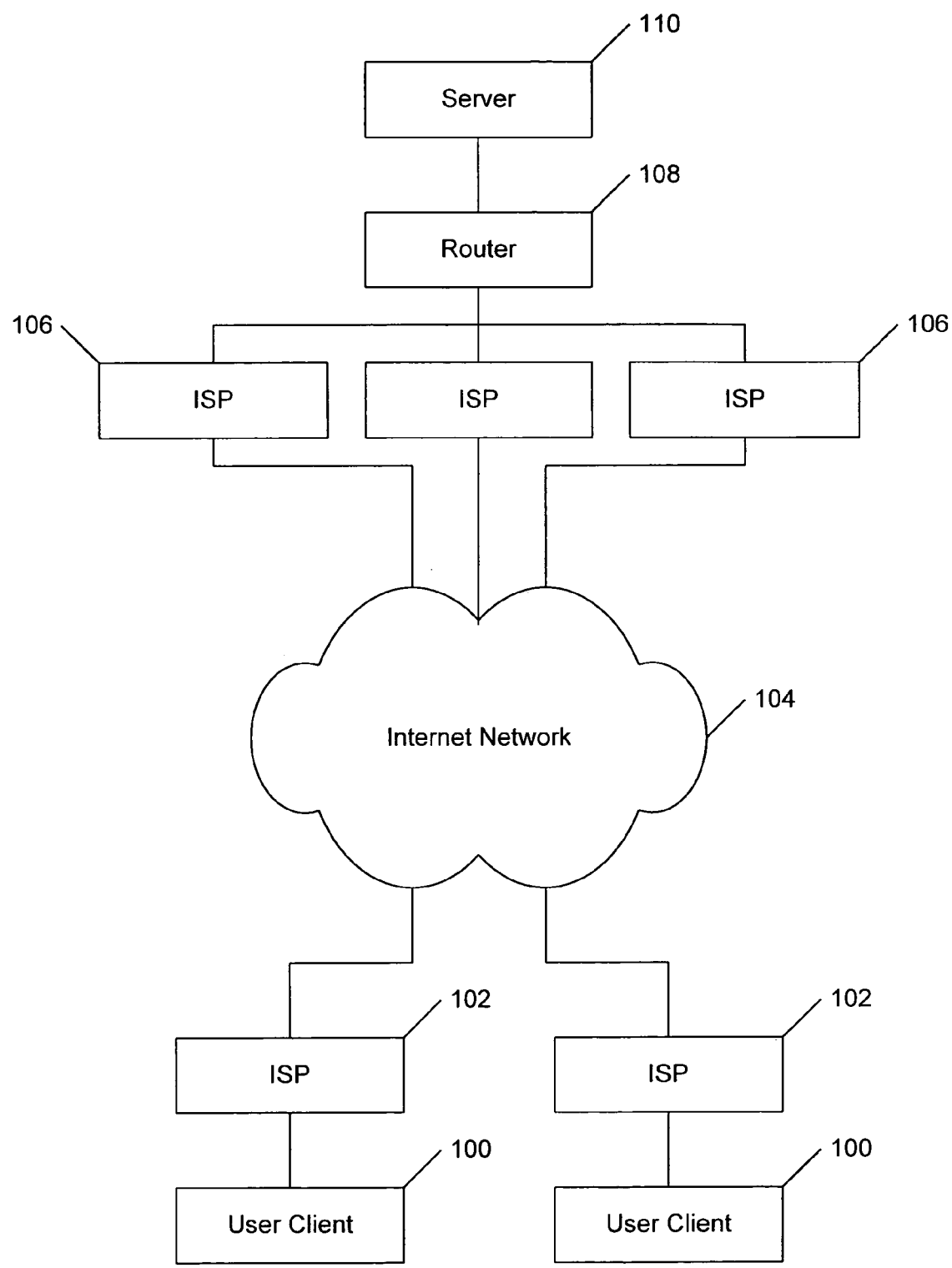
FIG. 1 shows a typical configuration of a large area network, such as the Internet.

Embodiments of the invention are directed to a method, system, and computer program for real-time measurement and modification of the performance of communications on large area networks, such as the Internet, based upon actual user experience. One embodiment performs a statistical analysis of access logs that record actual server usage by users. Based on such analysis, routing of communications over the network can be modified to improve overall communications performance. Embodiments may also output results indicative of overall communications performance and of server applications that interact poorly or especially well with network conditions, thus providing direction to application development efforts.

More particularly, one embodiment of the invention creates correlation assessments of performance related measurements against the geographical location of and/or routes taken by client applications. A route is determined by aggregating client Internet Protocol (IP) addresses according to Classless Inter-Domain Routing (CIDR) blocks or route advertisements available in a conventional fashion by querying a router or router server for such advertisements.

The results of these analyses define which geographical location or route may be performing better or worse than a comparative geographical location or route. Based on such comparisons, active steps may be taken to modify routing of network traffic to increase overall client-server performance.

In addition, each web server running a set of applications can be compared with every other server running a set of applications within the same domain. Such a comparison can detect differences in configuration of the servers, and permits identification of servers that are providing poor performance to users. Based on such comparisons, active steps may be taken to modify the configurations of dissimilar servers to match the performance of other servers within a group of evaluated servers.

An advantage of using such log file analysis over active measurements for detecting performance over a large area network such as the Internet is that historical records of an end user's experience can be mined for objective quantitative information and compared to the experience of other end users collected at or near the same time. This allows for identifying the root cause of performance problems. Since actual user experience is assessed, the limitation of a few, expensive sampling locations of beacons or agents is eliminated. The integrity of the analysis for any individual web site is limited by the popularity of a web site residing on a web server. However, an enterprise hosting multiple web sites can alleviate this limitation by aggregating across multiple web sites for the same end-user population. Tuning the performance of a web site to those users already using it enhances current users' experience.

One embodiment of the invention creates Pareto analyses of different applications running on a server where applications taking longer than a configurable time interval for greater percentages of the use of the application by end users are sorted in order from "most often" to "least often" exceeding the interval. Based on such an analysis, allocation of application developer resources to poorest performing applications can be made to improve the application and improve the end user experience.

Statistical Analysis Process Flow

Figure 2:
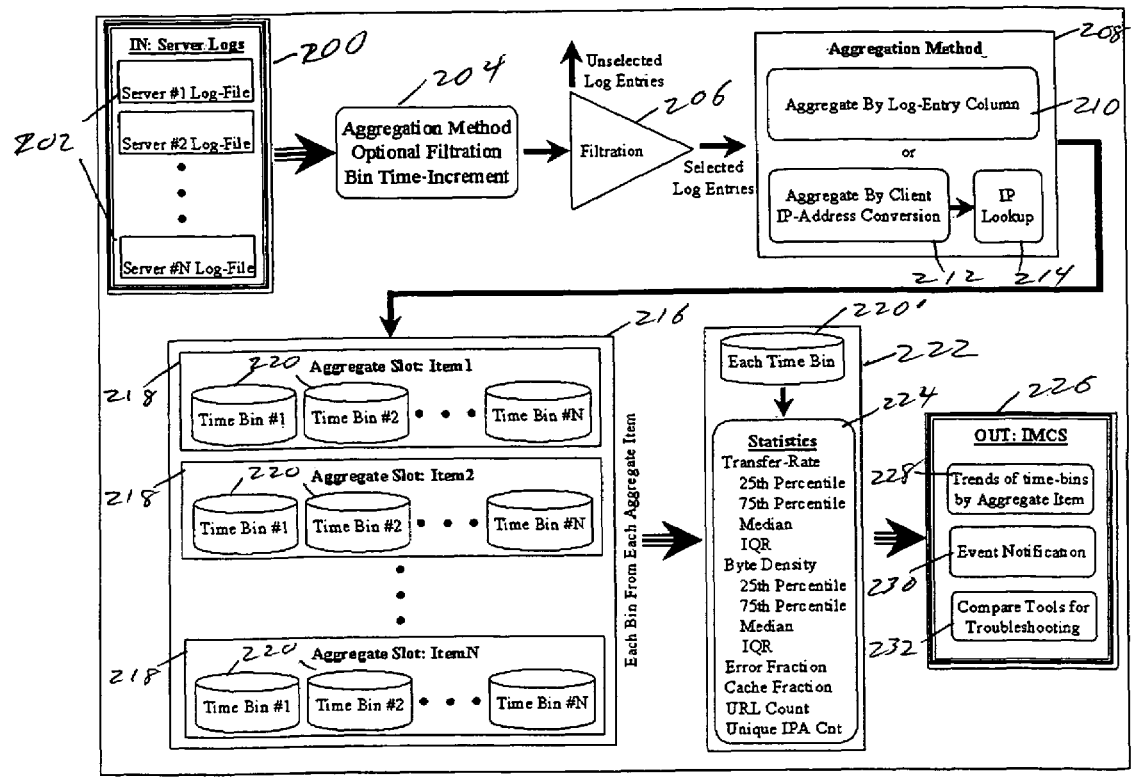
FIG. 2 is a process flow diagram showing one embodiment of the invention.

FIG. 2 is a process flow diagram showing an embodiment of the invention adapted for use with the Internet. One input to the process is a server log file 200 that is maintained on a web server 110 (see FIG. 1) or a mounted file system in conventional fashion. In the illustrated embodiment, the server log file 200 is configured according to World Wide Web Consortium (W3C) standards, and includes a log file 202 for each web server 110 being monitored within a server group. A typical server log file 200 configured to such standards records all user accesses of every element of a web page. A typical logical organization for the server log file 200 is a table having columns for every recorded data item, and rows for each access event. In particular, a server log file 200 that is most suitable for use with the invention records the following data for each user access of every element of a monitored web page: a time stamp indicating when a record was created in the server log file 200; client IP (c_ip) address; bytes transmitted from client application to server (cs_bytes); bytes transmitted from server to client application (sc_bytes); the time taken to complete a two-way transmission of bytes between a client and a server (time_taken); status codes documenting an action for each web page element (status_code); each URL (uniform resource locator) requested by a client browser (uniform resource identifier stem, or uri_stem); the type of browser used by the end-user (user-agent); and each URL referring to the uri_stem (uniform resource identifier referrer, or uri_referrer). Other information may also be included in each record, as desired or in order to comply with Internet standards.

In the illustrated embodiment, any particular server log file 200 is closed to new data entries before commencement of any statistical analysis. A new log file may be opened in known fashion to continue to record user access while the closed log file 200 is analyzed. Embodiments of the invention may also use log file entries written from a server directly to a flat file or database.

Process parameters are defined in a process settings step 202. In this step, an analyst either selects an aggregation method 204 (e.g., "aggregate by log-file column", or "aggregate by client IP address"). Optional filtration parameters, and an aggregation bin time increment, or these parameters set by reference to default (i.e., pre-established) settings.

If filtration parameters are set in the process settings step 202, the data in the server log file 200 is filtered at 206 to remove records that are not to be counted in further statistical analyses. For example, such records may be from non-customer sources, such as a beacon or agent, and thus do not reflect actual user accesses to the web server 110. In the illustrated embodiment, and agent ID field within a conventional W3C complaint server log file is used to filter out undesirable records. However, any desired record field may be used to perform a selected filtration. In the illustrated embodiment, filtering is implemented as a string matching function that compares a filter string to any character string or substring in any of the log file fields. Other types of filtering may be employed, such as by comparing the client IP (c_ip) address against a "lookup" table of addresses to include or exclude.

The selected log file records are then processed in an aggregation step 208 using the aggregation method defined in the process settings step 202. Typical aggregation methods are an "aggregate by log-file column" method 210 (e.g., AS-path, country, region, etc.) or an "aggregate by client IP address" method 212. The aggregation method creates entries within an aggregation table 216 having multiple aggregate slots 218 each generally having multiple time bins 220.

For example, the log-file column aggregation method 210 reads a defined record column (or "field") data value and time stamp for each selected log file record and assigns that record to a corresponding time bin 220 within the appropriate aggregate slot 218. Thus, records accumulated over a 24-hour period and corresponding to a first defined column data value can be assigned to 24 1-hour time bins 220 in a first aggregate slot 218, while records corresponding to a second defined column data value are assigned to 24 1-hour time bins 220 in a second aggregate slot 218.

If the "aggregate by client IP address" method 212 is selected in the process settings step 202, it is generally desirable to convert the raw IP address of a user client system 100 accessing the web server 110 to a geographic location or specific source (e.g., country, region, company, and/or ISP). In the illustrated embodiment, this is accomplished by supplying the client IP (c_ip) address from each record to an IP Lookup function 214, which returns geographic location or specific source information associated with that address. One implementation of the IP Lookup function 214 is described in detail below.

Once the aggregation table 216 has been created, the log file entries within each time bin 220' may be subjected to a statistical analysis process 222. This process applies a variety of statistical analysis algorithms 224 to derive information on server usage and statistical significance of such information based on the actual user access records. Collections of multiples of such time-bins 220' can also be assembled in chronological order to determine trends for each of the statistical measures. In the illustrated embodiment, the basic rate and count information computed are: byte-density (computed as sc_bytes+cs_bytes); transfer-rate (computed as byte-density divided by time taken); URL-count (total number of log entries); error-fraction (the fraction of all log entries having errors); cache-fraction (the fraction of all log entries having cached URL's as determined by response code); and unique-IP-address-count (the number of unique IP addresses among all log entries). Once the basic rate and count information is computed, distribution statistics may be computed for some or all of such basic information. In particular, in the illustrated embodiment, distribution statistics, such as quartiles, interquartile range (IQR), and median, are computed in known fashion for the byte-density and transfer-rate statistics.

The results of the statistical analysis process 222 can generate output 226 in several forms. The raw data from the statistical analysis process 222 can be output directly. Trend information 228 can be output (e.g., in table or graphical form) to show the trends of time bins by aggregate slot or item. Various comparison tests (e.g., out of range, over threshold, percentage change, etc.) can be applied to the basic rate and count information as well as the distribution statistics to trigger an event notification 230 (e.g., notice to a network administrator) if any selected statistical value is abnormal. Further, the statistical information for multiple time bins and/or aggregate items can be input to various comparison tools 232 for troubleshooting. For example, the IQR statistics for the byte-density for two servers within a domain can be compared graphically for visual assessment by a network administrator. Generation of such trend displays, event notifications, and comparisons is well-known in the art.

Thus, the illustrated embodiment of the invention can create correlation assessments of performance related measurements against the geographical location and/or route traversed during use of a network application by an end-user. In particular, transfer-rate and error-fraction measurements can be correlated to at least the following parameters: geographical location of c_ip addresses; ISP for c_ip addresses; net block or route of c_ip addresses; and applications requested (uri_stem) or previously requested (uri_referrer) by client applications or users from the web server 110. The results of these analyses define which geographical location, ISP, net block, route, or application may be performing better or worse than a comparative geographical location, ISP, net block, route, or application.

The validity of the correlations is ensured by performing statistical validity checks between applications and servers, such as by ensuring similarity or sufficiency of certain of the computer distribution statistics, in known fashion. The byte-density, URL-count, and unique-IP-address-count parameters are used to ensure valid correlations. For example, since the common TCP/IP protocol (the protocol used over the Internet) changes its performance based on the number of packets transmitted (through congestion control and "slow start" mechanisms), requiring a similar value for the byte-density parameter ensures that differences between servers or services of different applications are due to other interesting parameters (such as the geographical location of c_ip addresses, ISP for c_ip addresses; etc.) instead of resulting from artifacts (e.g., large byte transfers generated by the TCP/IP protocol itself). The combination of the URL-count and the unique-IP-address-count parameters represent the sample size of the analysis space. Since each unique IP address essentially represents a different end-to-end communication path, the unique-IP-address-count measures the diversity of the network space being measured. Requiring that the URL-count and the unique-IP-address-count parameters exceed a selected threshold helps ensures that the correlations described above are valid.

If the correlations described above indicate a problem, actions may be undertaken to rectify the problem. These actions may include: selecting a better exit path from a multi-homed (i.e., having multiple ISPs) data center (described in greater detail below); notifying a network administrator to repair a server which is performing below the level of ostensibly identical servers; and indicating the need to re-write applications which are slow performing. For this later case, it may be that the applications perform well during local area network testing, but log file analysis in accordance with the invention may reveal an application specific sensitivity to actual Internet conditions.

IP Lookup Function

Figure 3:
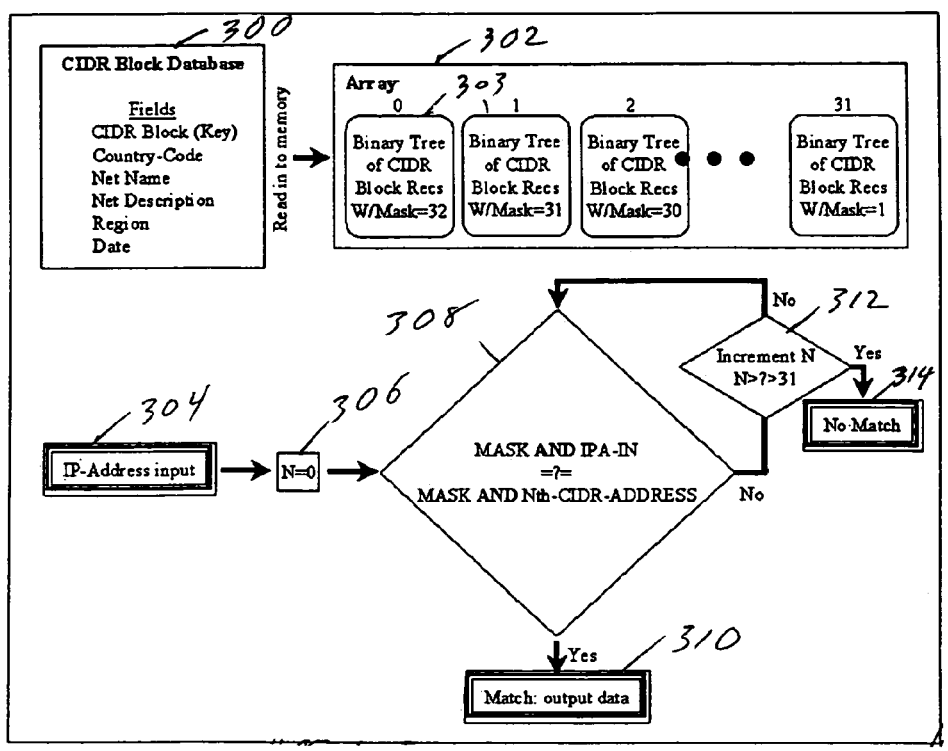
FIG. 3 is a flowchart for a process comparing information from a Classless Inter-Domain Routing (CIDR) block database and an Internet Protocol (IP) address input in order to convert the IP address to geographic or source information according to one embodiment of the invention.

FIG. 3 is a flowchart showing an embodiment for comparing information from a Classless Inter-Domain Routing (CIDR) block database 300 and an IP address input 304 in order to convert the IP address to geographic or source information. A CIDR block defines a subnet of a larger network. A CIDR address includes a standard 32-bit IP address and also information on how many bits are used for the network prefix. This addressing scheme allows for efficient allocation of IP addresses compared to prior standards. The CIDR addressing scheme also enables "route aggregation" in which a single high-level route entry can represent many lower-level routes in global routing tables.

In the illustrated embodiment for the Internet, the CIDR block database 300 is specially generated by querying (using conventional Internet query commands) regional Internet registries for CIDR blocks that have been assigned through such registries. The responses from the registries include CIDR block address (used as the database key), country code, network name, network description, region (i.e., sub-country geographical information, sometimes down to a street address), and date of the last update for each registry record.

During operations, the CIDR block database 300 may be read into memory organized as a 32-element array 302. Each array element 303 is a binary tree of CIDR block records selected with a unique subnet mask value. For example, array element "0" contains a binary tree of all CIDR block records whose subnet mask is "255.255.255.255" (i.e., having a binary representation of 32 "1's"). Similarly, array element "1" contains a binary tree of all CIDR block records whose subnet mask is "255.255.255.254" (i.e., having a binary representation of 31 "1's" followed by one "0" as the least significant bit). This pattern continues, such that array element "31" contains a binary tree of all CIDR block records whose subnet mask is "1.0.0.0" (i.e., having a binary representation of one "1" followed by 31 "0's").

The subnet mask for each array element is used to mask a target IP address before searching the element's associated binary tree. The subnet mask can be computed from the CIDR block mask number as the binary complement of $2^{32-MaskNumber}-1$. This configuration of CIDR blocks in the memory array 302 provides for most specific CIDR block/IP address matching.

In operation, a target c_ip address from a record in the server log 200 is used as input to the most specific CIDR block/IP address matching process (STEP 304). For each c_ip address, a counter N is set to "0", representing array element "0" (STEP 306). Using the subnet masking technique described above, the target c_ip address is masked with the array element's associated subnet mask (e.g., all "1's" for array element "0"), and the corresponding array element's binary tree is then traversed to find a record match (STEP 308). In particular, the masked IP address component of each CIDR block for each record traversed in the $N^{th}$ binary tree is compared against the masked target IP address.

If a match exists, then desired record fields from the corresponding CIDR block (e.g., country code, network name, network description, region, and/or date) are sent to output to be used for binning by the lookup requestor (STEP 310). Thus, the c_ip address is converted to geographical and source information.

If no match occurs (STEP 308), N is incremented and tested for being in the range 0-31 (STEP 312). If N is out of range, no match exists and is so indicated (STEP 314). Otherwise, the match process continues with the next array element through similar masking of the target c_ip address and traversal of the associated binary tree for the incremented value of N.

Active ISP Routing

Figure 4:
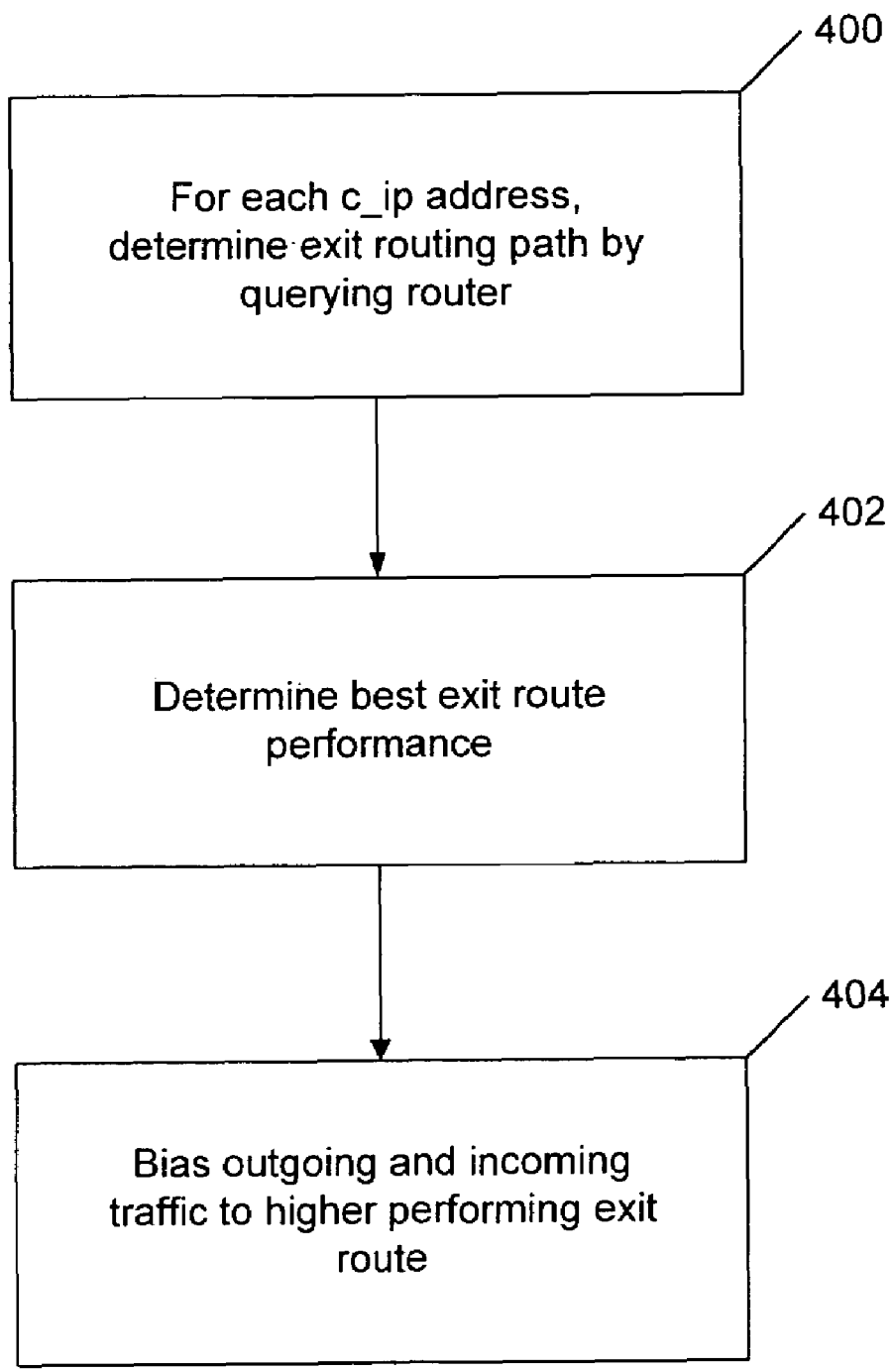
FIG. 4 is a flowchart showing an embodiment for modifying traffic paths through a router to the Internet.

FIG. 4 is a flowchart showing an embodiment for modifying traffic paths through a router to a large area network such as the Internet. After the statistical analysis describe above is performed, the results can be used to "tune" performance of a server system. In the illustrated embodiment, the exit route for communications from a web server 110 through the router 108 and all connected server ISPs 106 to the network 104 is determined for each c_ip address (STEP 400). This may be accomplished by querying the router 108 (or a route server), using conventional network control commands, for the routing table maintained by the router 108. The routing information my then be analyzed to determine which exit path has the highest performance (e.g., highest transfer-rate for a particular destination) at 402.

Once a preferred exit route is determined, the routing of traffic may be biased towards that exit route (or, alternatively, away from the most poorly performing exit routes) at 404. For the Internet, this may be done using Border Gateway Protocol (BGP) mechanisms. BGP is commonly used as a router-to-router protocol between administrative domains. For example, in the illustrated embodiment, outgoing traffic is biased by modifying incoming routing update information using BGP path prepending or local preference mechanisms. Similarly, incoming traffic is biased by modifying outgoing routing update information using BGP path prepending or community string mechanisms.

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), at least one input device, and at least one output device. The program code is executed on the processors to perform the functions described above.

Each such program may be implemented in any desired computer language (including machine, assembly, or high level procedural, logical, or object oriented programming languages) to communicate with a computer system. In any case, the language may be a compiled or interpreted language.

Each such computer program may be stored on a storage media or device (e.g., solid state, magnetic, or optical media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for real-time measurement of the performance of communications on a large area network between a selected server and a plurality of users at client machines, based upon actual user experience, including:
   accessing a server log having user-interaction records indicative of user interactions that occur with one or more applications running on the selected server and that are carried on communications associated with routings through nodes of the network;
   determining from the records, assessments of the performance of the communications experienced by the plurality of users;
   determining correlations between the assessments of the performance and the routings of the communications;
   validating the correlations based on an analysis of two or more parameters associated with the user interactions, wherein the parameters include at least two parameters selected from the group consisting of byte-density, URL count, and unique IP address count, wherein the byte-density is a function of client to server bytes and server to client bytes, and the URL count represents a total number of log entries; and
   based on the correlations, modifying one or more of the routings to improve the performance.

2. The method of claim 1, wherein at least one of the nodes is part of a communication path connecting one of the client machines to the selected server.

3. The method of claim 1, further including generating an event notification if a selected statistical analysis value is abnormal.

4. The method of claim 1, further including selecting an aggregation method from a set of aggregation methods for aggregating the user-interaction records according to a parameter.

5. The method of claim 4, wherein the aggregation method includes aggregation by log-file record column data value for each record from the server log.

6. A method as in claim 1, wherein determining assessments comprises applying a statistical analysis that determines time for specified user access relative to a specified interval, and sorts said user access according to a number of times that the application exceeds said interval.

7. A method as in claim 1, wherein said server log includes a time stamp indicating when a record was formed, a client IP address, a time taken to complete transmission, and a size of the transmission.

8. A method as in claim 7, wherein said server log is formed by adding new data entry to the server log, and said server log is closed to further data entry prior to said determining assessments of the performance of the communications.

9. A method as in claim 7, further comprising determining a geographic location from the IP address, and aggregating IP addresses having a specified relationship with a specified geographical location.

10. The method of claim 9, wherein determining a geographic location includes:
    defining a database comprising large area network address blocks having geographical or source information;
    comparing an address field in each record to the address blocks in the database; and
    associating with each record the geographical or source information from an address block matching the address field of the record.

11. The method of claim 10, wherein comparing an address field in each record to the address blocks in the database includes:
  defining an array of binary trees for the address blocks in the database, each address block within a binary tree within an array element being masked by a corresponding unique subnet mask value;
  masking each address field in each record by a unique subnet value corresponding to a selected array element;
  comparing each masked address field to an address field of the address blocks within the binary tree of the selected array element;
  outputting selected fields of any matching address block; and
  otherwise, continuing the step of comparing with a next selected array element until a match is found or all array elements have been compared.

12. A method as in claim 7, further comprising aggregating said time bins into chronological order and determining trends among said time bins.

13. A method as in claim 7, wherein determining assessments of the performance of the communications comprises determining a computer byte density, transfer fate, and error fraction.

14. A method as in claim 7, wherein determining correlations comprise applying a statistical analysis to assess a performance related measurement against a geographical location of a client.

15. A method as in claim 7, wherein determining correlations comprise applying a statistical analysis to assess a route traversed during use of the one or more applications by an end user.

16. A method as in claim 1, wherein modifying one or more of the routings further comprises determining a new routing.

17. The method of claim 1, further including:
  determining exit routing paths from each selected server based on the records from the server log;
  determining a best performing exit route based on a statistical analysis of records from the server log;
  biasing incoming and outgoing communications with respect to each server to use the determined best performing exit route.

18. The method of claim 1, wherein determining assessments further comprises:
  filtering out selected records from the server log, wherein the filtering removes the selected records from further consideration;
  aggregating records from the server log into a plurality of aggregate slots, each slot having at least one time bin which represents an interval of time, based on an aggregation method;
  performing at least one statistical analysis separately on each time bin of each aggregate slot; and
  outputting the results of such statistical analysis as an indication of actual access-to-server usage by users.

19. The method of claim 1, wherein the parameters associated with the user interactions include URL count and unique IP address count.

20. A system for real-time measurement of the performance of communications on a large area network between a selected server and a plurality of users at client machines, based upon actual user experience, including:
  a server log having user-interaction records with data indicative of user interactions that occur with one or more applications running on the selected server and that are carried on communications associated with routings through nodes of the network one or more processors configured to determine from the records, assessments of the performance of the communications experienced by the plurality of users;
  determine correlations between the assessments and the routings;
  validate the correlations based on an analysis of two or more parameters associated with the user interactions, wherein the parameters associated with the user interactions include at least two parameters selected from the group consisting of byte-density, URL count, and unique IP address count, wherein the byte-density is a function of client to server bytes and server to client bytes, and the URL count represents a total number of log entries; and
  based on the correlations, generate a command for modifying one or more of the routings to improve the performance.

21. The system of claim 20, wherein at least one of the nodes is part of a communication path connecting one of the client machines to the selected server.

22. The system of claim 20, further including means for generating an event notification if a selected statistical analysis value is abnormal.

23. The system of claim 20, further including means for selecting an aggregation method from a set of aggregation methods for aggregating the user-interaction records according to a parameter.

24. The system of claim 23, wherein the aggregation method includes aggregation by log-file record column data value for each record from the server log.

25. A system as in claim 20, wherein said server log includes a time stamp indicating when a record was formed, a client IP address, a time taken to complete transmission, and a size of the transmission.

26. A system as in claim 25, wherein said server log is formed by added new data as entries to the server log, and said server log is closed to further data entry prior to said determining assessments.

27. A system as in claim 25, wherein said one or more processors converts the IP address into a geographical location, and aggregates IP addresses having a specified relationship with a specified geographical location.

28. A system as in claim 25, wherein said statistical analysis is an assessment of performance related measurement against a geographical location of a client.

29. A system as in claim 25, wherein the one or more processors are configured to determine an assessment of a route traversed during use of the one or more applications by an end user.

30. A system as in claim 20, further comprising a communication routing part, determining a new routing.

31. The system of claim 20, further comprising:
  means for determining geographical or source information for each record; and
  means for selecting an aggregation method to aggregate records based on such geographical or source information.

32. The system of claim 31, wherein the means for determining geographical or source information for each record includes:
  a database comprising large area network address blocks having geographical or source information;
  a comparison function for comparing an address field in each record to the address blocks in the database; and
  an associating function for associating with each record the geographical or source information from an address block matching the address field of the record.

33. The system of claim 32, wherein the comparison function includes:
- an array of binary trees from the address blocks in the database, each address block within a binary tree within an array element being masked by a corresponding unique subnet mask value;
- means for masking each address field in each record by a unique subnet value corresponding to a selected array element;
- means for comparing each masked address field to an address field of the address bocks within the binary tree of the selected array element;
- means for outputting selected fields of any matching address block; and
- means for otherwise continuing the step of comparing with a next selected array element until match is found or all array elements have been compared.

34. The system of claim 20, further including:
- means for determining exit routing paths for each selected server based on the records from the server log;
- means for determining a best performing exit route based on a statistical analysis of records from the server log;
- means for biasing incoming and outgoing communications with respect to each server to use the determined best performing exit route.

35. The system of claim 20, wherein the one or more processors are further configured to:
- filter out selected records from the server log, wherein the selected records are removed from further consideration;
- aggregate records from the server log into a plurality of aggregate slots, each having at least one time bin, based on an aggregation method;
- perform at least one statistical analysis of each time bin, representing a time interval, of each aggregate slot; and
- output the results of each statistical analysis as an indication of actual server usage by users.

36. The system of claim 20, wherein the parameters associated with the user interactions include URL count and unique IP address count.

37. A computer program, stored on a tangible computer-readable medium, for real-time measurement of the performance of communications on a large area network between a selected server and a plurality of users at client machines, based upon actual user experience, the computer program comprising instructions for causing a computer system to:
- access a server log having user-interaction records indicative of user interactions that occur with one or more applications running on the selected server and that are carried on communications associated with routings through nodes of the network;
- determine from the records, assessments of the performance of the communications experienced by the plurality of users;
- determine correlations between the assessments and the routings; validate the correlations based on an analysis of two or more parameters associated with the user interactions, wherein the parameters associated with the user interactions include at least two parameters selected from the group consisting of byte-density, URL count, and unique IP address count, wherein the byte-density is a function of client to server bytes and server to client bytes, and the URL count represents a total number of log entries; and
- based on the correlations, modify one or more of the routings to improve the performance.

38. The computer program of claim 37, wherein at least one of the nodes is part of a communication path connecting one of the client machines to the selected server.

39. The computer program of claim 37, further including instructions for causing the computer system to generate an event notification if a selected statistical analysis value is abnormal.

40. The computer program of claim 37, further including instructions for causing the computer system to select an aggregation method from a set of aggregation methods for aggregating the user-interaction records according to a parameter.

41. The computer program of claim 40, wherein the aggregation method includes aggregation by log-file record column data for each record from the server log.

42. The computer program as in claim 37, wherein said instructions to access the server log comprises instructions to access a server log that includes time information about records, client IP address, time taken to compete a transmission, and a size of the transmission.

43. The computer program as in claim 42, further comprising instructions to convert the IP address into information indicative of a geographical location, and to aggregate the information according to the geographical location.

44. The computer program as in claim 43, further comprising instructions to perform a statistical analysis of performance versus geographical location of the client.

45. The computer program as in claim 43, further comprising instructions to perform a statistical analysis assessing a route traversed during a network application.

46. The computer program as in claim 37 further comprising additional instructions to determine a new routing.

47. The computer program of claim 37, further including instructions for causing the computer system to:
- determine geographical or source information for each record; and
- select an aggregation method to aggregate records based on such geographical or source information.

48. The computer program of claim 47, wherein the instructions for causing the computer systems to determine geographical or source information for each record further include instructions for causing the computer system to:
- define a database comprising large area network address blocks having geographical or source information;
- compare an address field in each record to the address blocks in the database; and
- associate with each record the geographical or source information from an address block matching the address field of the record.

49. The computer program of claim 48, wherein the instructions for causing the computer system to compare an address field in each record to the address blocks in the database include instructions for causing the computer system to:
- define an array of binary trees for the address blocks in the database, each address block within a binary tree within an array element being masked by a corresponding unique subnet mask value;
- make each address field in each record by a unique subnet value corresponding to a selected array element;
- compare each masked address field to an address field of the address blocks within the binary tree of the selected array element;
- output selected fields of any matching address block; and
- otherwise, continue the step of comparing with a next selected array element until a match is found or all array elements have been compared.

50. The computer program of claim 37, further including instructions for causing the computer system to:
- determine exit routing paths from each selected server based on the records from the server log;
- determine a best performing exit route based on a statistical analysis of records from the server log;
- bias incoming and outgoing communications with respect to each server to use the determined best performing exit route.

51. The computer program of claim 37, further including instructions for causing the computer system to:
- filter out selected records from the server log, wherein the selected records are removed from further consideration;
- aggregate records from the server log into a plurality of aggregate slots, each having at least one time bin, based on an aggregation method;
- perform at least one statistical analysis of each time bin, representing a time interval, of each aggregate slot; and
- output the results of each statistical analysis as an indication of actual server usage by users.

52. The computer program of claim 37, wherein the parameters associated with the user interactions include URL count and unique IP address count.

* * * * *